(12) United States Patent
Zhao et al.

(10) Patent No.: US 11,741,358 B2
(45) Date of Patent: Aug. 29, 2023

(54) APPLICATION RECOMMENDATION MACHINE LEARNING SYSTEM

(71) Applicant: INTUIT INC., Mountain View, CA (US)

(72) Inventors: Runhua Zhao, San Jose, CA (US); Naveen Rajendrapandian, San Ramon, CA (US); Chris J. Wang, San Francisco, CA (US)

(73) Assignee: INTUIT, INC., Mountain View, CA (US)

( * ) Notice: Subject to any disclaimer, the term of this patent is extended or adjusted under 35 U.S.C. 154(b) by 736 days.

(21) Appl. No.: 16/791,380

(22) Filed: Feb. 14, 2020

(65) Prior Publication Data

US 2021/0256366 A1 Aug. 19, 2021

(51) Int. Cl.
*G06N 3/08* (2023.01)
*G06F 16/9535* (2019.01)
*G06N 3/045* (2023.01)

(52) U.S. Cl.
CPC ........... *G06N 3/08* (2013.01); *G06F 16/9535* (2019.01); *G06N 3/045* (2023.01)

(58) Field of Classification Search
CPC ..... G06N 3/08; G06N 3/0454; G06F 16/9535
See application file for complete search history.

(56) References Cited

U.S. PATENT DOCUMENTS

| | | | | |
|---|---|---|---|---|
| 11,017,764 | B1* | 5/2021 | Das | G06F 16/243 |
| 11,068,284 | B2* | 7/2021 | Gauffin | G06N 20/00 |
| 11,416,298 | B1* | 8/2022 | Barker, Jr. | G06F 11/10 |
| 2020/0045163 | A1* | 2/2020 | Hwang | H04M 1/72451 |
| 2020/0409731 | A1* | 12/2020 | Zhang | G06F 9/45533 |
| 2021/0042362 | A1* | 2/2021 | Ahn | G06F 9/546 |
| 2021/0092222 | A1* | 3/2021 | Kang | H04M 3/42221 |

* cited by examiner

*Primary Examiner* — Minh Chau Nguyen
(74) *Attorney, Agent, or Firm* — Patterson + Sheridan, LLP

(57) ABSTRACT

Certain aspects of the present disclosure provide techniques for generating a recommendation of third-party applications to a user by a recommendation engine. The recommendation engine includes two deep-learning models that use various data sources (e.g., user data and application data) to generate the recommendation. One deep-learning model generates a relevance score for each available third-party application. The relevance score is used to determine a relevant application(s). The other deep-learning model generates a connection score for each relevant application. The recommendation engine uses the relevance score and the connections to generate an engagement score for each relevant application to determine whether the user would use the third-party application if recommended to the user. Those relevant applications with an engagement score that meet pre-determined criteria are determined and displayed to the user in the application as a recommendation.

20 Claims, 8 Drawing Sheets

| Rank | Look back period | Feature 1 | Feature 2 | ... |
|---|---|---|---|---|
| 1 | 1 day | ... | | |
| 2 | 2 - 7 days | | ... | |
| ... | | | | ... |
| 10 | 60 - 180 days | | | |

FIG. 2

| App | Topic 1 | Topic 2 | Topic 3 | ... | Topic 50 |
|---|---|---|---|---|---|
| PYPL | 0.1 | 0.2 | 0.15 | ... | 0.25 |
| SQ | 0.1 | 0.9 | ... | | |
| ... | ... | | | ... | |
| AMZN | 0.8 | | | | ... |

FIG. 3

|  | Topic 1 | Topic 2 | Topic 3 | ... | Topic 50 |
|---|---|---|---|---|---|
| "eCom" | 0.7 | 0.1 | ... | ... | ... |
| "pay employee" | 0.2 | 0.85 | ... | ... | ... |

FIG. 4

| cust. ID | App Name | App Connect | App LTV Score |
|---|---|---|---|
| 101 | PayPal | 0 | 0.05 |
| 102 | Square | 1 | 0.95 |
| ... | ... | ... | ... |
| 123 | Amazon | 1 | 0.6 |

FIG. 5

TSheets Time Tracking

Simplify payroll and invoicing with time tracking powered by QuickBooks!

★★★★★ (4069 reviews)

| Overview | Pricing | Reviews | FAQs |

Learn more

Key benefits

- Access accurate employee time tracking for precise invoices and painless payroll. The TSheets mobile app puts employee time data at your fingertips. It's the only time tracker that works directly inside QuickBooks Online. No more manual data entry!
- Paper timesheets can't show you who's actually working, but TSheets can. Use the Who's Working window to see where your employees are and what they're working on, in real time. TSheets comes with GPS location tracking for greater accountability.
- Track time using the devices your employees already have. Employees can clock in quickly and easily, using a smartphone, computer, or time clock kiosk. Track time against different job codes to gain valuable business insight with TSheets reports.

How it works with QuickBooks

TSheets is proudly owned by Intuit and powered by QuickBooks! Find the robust employee time tracking capabilities of TSheets embedded directly inside QuickBooks Online. Your employees can track time from any location, using any device. Time data automatically syncs to your QuickBooks account in real time. From there, you can edit, review, and approve employee timesheets for payroll, job costing, billing, or invoicing – all without ever leaving QuickBooks! Any changes you make are automatically synced with TSheets, so your employee time data is always accurate.

Details

App information
Developer
TSheets
Categories
Track Time
Legal
Terms and conditions
Privacy policy

Contact
📞 (888) 836-2720
✉ help@tsheets.com

Support
https://help.tsheets.com

Feedback

FIG. 6

APPLICATION RECOMMENDATION MACHINE LEARNING SYSTEM

INTRODUCTION

Aspects of the present disclosure relate to a method and system for generating a personalized application recommendation for a user by a recommendation engine using various data sources.

BACKGROUND

Organizations can implement an application, allowing users (e.g., customers, potential customers, employees, advertisers, etc.) to perform specific tasks associated with the organization. For example, a company that provides financial-related services can provide an application to assist a user in preparing their tax return forms or making online transactions. In addition to assisting a user to perform a task, the application can also generate a recommendation to the user for third-party applications, which includes other application(s) implemented by the organization as well as application(s) implemented by other organizations. The application can make such a recommendation in order to boost user engagement and retention of not only the third-party application but of the application itself, as such recommendations increase the value and user experience of the application to the user.

However, generating a recommendation suitable for a user is difficult for an application to implement because all too often, the recommendation may not be of interest to the user or the user may not engage with the recommended third-party application. For example, the user may subscribe to a recommended third-party application but fail to actually use the third-party application. In another example, the application can fail to take an individual user (e.g., the user's attributes) into consideration when generating the recommendation and may generate a generic recommendation to newly released third-party applications for all users of the application. While some third-party application recommendations may take into consideration data associated with the user, the use of such data is often limited or restricted for generating a recommendation. For example, only data sources in a specific format can be used to generate a recommendation. Data in an un-recognized, or un-structured, format are difficult to extract value from and effectively unavailable for purposes of generating a recommendation for a user.

Failure of an application to generate a recommendation of suitable third-party application(s) can reflect poorly on the application as well as the organization that implemented the application, as such a recommendation may indicate the application and/or the organization does not understand the user or value the user's time by providing poor recommendations to the user of third-party applications.

As such, a solution is needed to provide a framework for an application to generate a recommendation of third-party application(s) that are suitable for a user.

BRIEF SUMMARY

Certain embodiments provide a method for generating personalized application recommendation(s) by using various data sources via a recommendation engine. The method generally includes accessing user data associated with a user including time dependent data and static profile data. The method further includes accessing a first set of application data for each application of a set of applications. The method further includes inputting the user data for the user and the first set of application data for each application to a first deep-learning model trained to predict a likelihood of a user selecting an application by associating the user data with application data for each application. The method further includes generating, via the first deep-learning model, a relevance score for each application. The method further includes determining, based on the relevance score, a first subset of applications the user is likely to select based on the user data and the first set of application data. The method further includes inputting the user data for the user and a second set of application data for the first subset of applications to a second deep-learning model trained to predict a likelihood of a length of time the user will use an application in the first subset of applications. The method further includes generating, via the second deep-learning model, a connection score for each application in the first subset of applications. The method further includes displaying a second subset of applications from the first subset of applications as a personalized recommendation to the user.

Other embodiments provide systems configured to generate personalized application recommendations by using various data sources in a recommendation engine. Additionally, other embodiments provide non-transitory computer-readable storage mediums comprising instructions that, when executed by a processor of a computing system, causes the computing system to generate personalized application recommendations by using various data sources in a recommendation engine.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 depicts an example of time dependent data according to an embodiment.

FIG. 3 depicts an example diagram of application topic data according to an embodiment.

FIG. 4 depicts an example diagram of application keyword data according to an embodiment.

FIG. 5 depicts an example diagram of application lifetime value data according to an embodiment.

FIG. 6 depicts an example user interface displaying a recommendation generated by the recommendation engine according to an embodiment.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
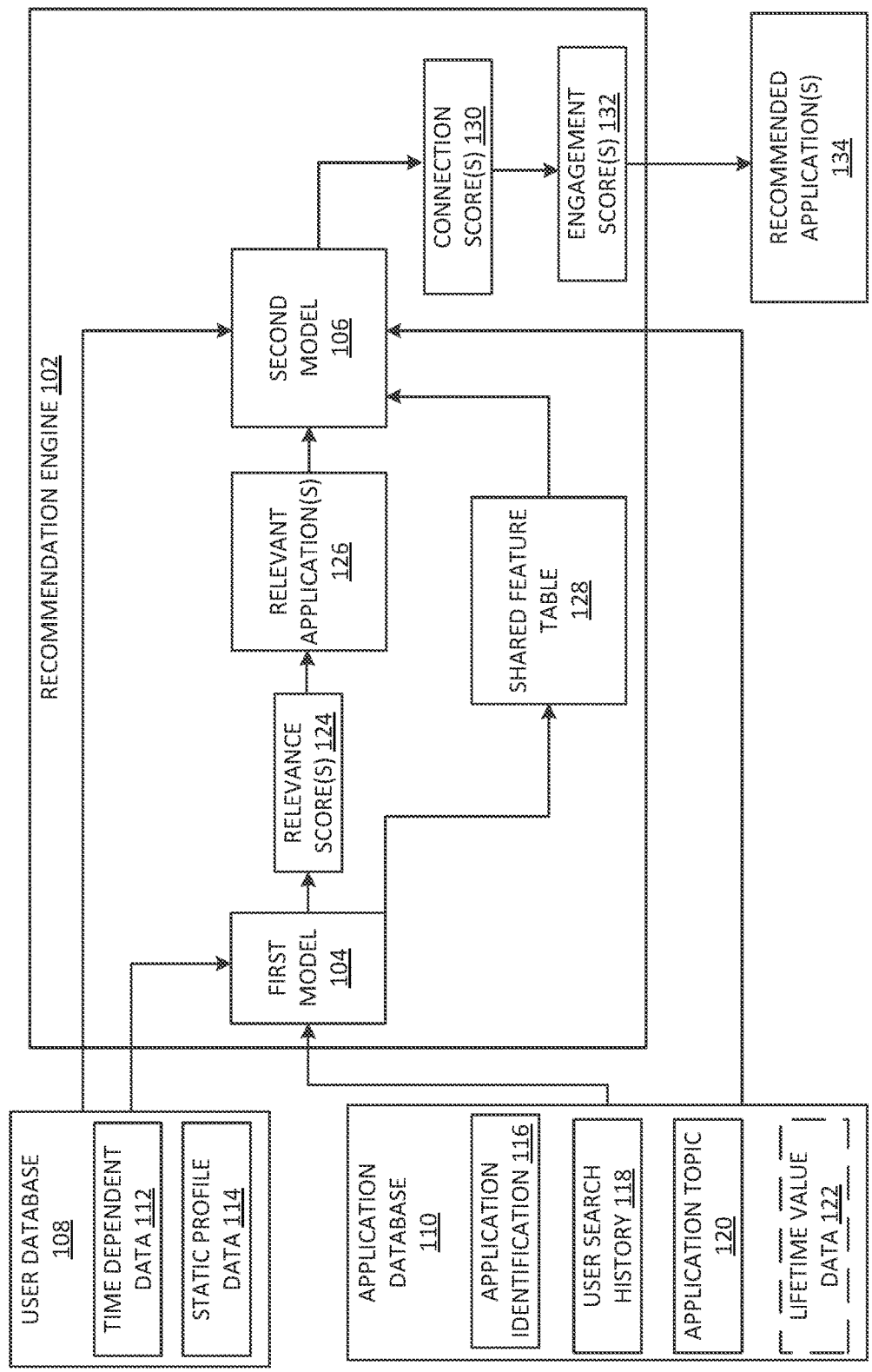
FIG. 1 depicts an example diagram of a recommendation engine for generating a recommendation to a user according to an embodiment.

Aspects of the present disclosure provide apparatuses, methods, processing systems, and computer readable mediums for generating a personalized application recommendation for a user by a recommendation engine using various data sources.

An organization can provide to users (e.g., customers, potential customers, employees, advertisers, etc.) an application with a recommendation engine capable of generating recommendations of third-party applications to the user. The third-party applications can include other applications implemented by the organization as well as applications implemented by other entities (e.g., organizations, individuals, etc.). The recommendation engine includes two deep-learning models trained to take various sources of data including user data and application data to generate a recommendation of a set of third-party applications. The third-party application(s) recommended to the user include those third-party applications the recommendation engine has determined to be of relevance to the user and that the user will connect and use. In some cases, the recommendation can be displayed to the user upon request or automatically (e.g., in real time) within the application. By providing a recommendation of third-party application(s), the recommendation engine can enhance user experience of the application.

To generate a recommendation of the third-party application(s), a recommendation engine of an application accesses user data associated with the user and application data associated with the third-party applications. The user data can include time dependent data and static profile data.

In some cases, the recommendation engine generates the time dependent data (e.g., on a periodic basis) of a user by identifying different types of user activity (e.g., based on a time stamp associated with the activity). Once the different types of user activity are identified, the recommendation engine aggregates the user activity based on time stamp(s) according to corresponding time segments or windows. For example, the user activity of the most recent 24 hours can be aggregated into a first time segment corresponding to the 24 hour time window. User activity from 48 hours prior to the most recent 24 hours can be aggregated into a second time segment corresponding to those 48 hours. The static profile data can include information about the user collected by the application such as from the user's profile (e.g., name, age, address, etc.), product or service associated with the user, etc.

The application data initially accessed by the recommendation engine includes an identification (or index) value associated with third-party applications (e.g., used previously by the user, available to the user for download, etc.). Both the user data and application data are input to a first deep-learning model. In some cases, the first deep-learning model can be a click through retention (CTR) model. The first deep-learning model (or CTR model) determines based on the user data and application data which third-party applications a user may be interested in. The first deep-learning model determines a user's potential interest in a third-party application based on the user data and application data by transforming both types of data into a standard, vector format. The vectors are then concatenated within the first deep-learning model and passed through an activation function (e.g., Softmax) to generate a relevance score for each available third-party application, indicating whether a user is predicted to find relevance (or interest) in that third-party application. Based on the relevance scores, a subset of third-party applications can be identified as being of interest or relevant to the user. For example, the relevance scores of third-party applications that meet (or exceed) a pre-determined threshold value can be of interest or relevant to the user. In another example, the top-X (where X indicates a positive, non-zero integer value) highest relevance scores of third party-applications can indicate which third-party applications can be of interest and relevant to the user.

Once a subset of third-party applications are identified, based on the relevance score, the recommendation engine continues processing data in a second deep-learning model. In some cases, the relevant applications are input to the second deep-learning model in the following row format: User# Rec. App.#: App Name (e.g., User1 Rec. App. 1: AMZN). The second deep-learning model can be a retention model for determining which of the relevant third-party applications the user is likely to actually use. In order to determine this, the second deep-learning model, or retention model, accesses user data and application data. The second deep-leaning model accesses different types of application data than the first deep-learning model. For example, unlike the first deep-learning model, the second deep-learning model accesses data indicative of the user's activity within the application, such as user search history, topic scores, and other data indicating user activity within the application. Additionally, the second deep-learning model can retrieve vector data about third-party application(s) from a shared feature table. The shared feature table stores vector data about third-party application(s) generated from the first deep-learning model, and the second deep-learning model uses the vector data rather than re-generating the same vector data.

The second deep-learning model transforms the user data and the application data into vectors using a recurrent neural network (RNN) and thereafter, the vectors are concatenated. In the second deep-learning model, the concatenated vector passes through an activation function (e.g., sigmoid) to determine an estimated extent of usage of the third-party application. The second deep-learning model generates a connection score, indicating the user's likelihood of using the third-party application. Once the connection score is generated for each relevant third-party application, an engagement score is generated by combining the relevance score and the connection score. In some cases, the engagement score is generated by multiplying the relevance score and connection score of a third-party application.

After calculating the engagement score for each relevant third-party application, the top-X (where X is a positive, non-zero integer) third-party applications are displayed to a user. For example, if there are 500 third-party applications available to a user, the first deep-learning model can determine that out of the 500 third-party applications, 40 third-party applications are predicted to be of relevance and interest to the user based on the relevance score of the 40 third-party applications exceeding a threshold value. The second deep-learning model can then determine that out of the 40 third-party applications, 10 third-party applications are likely to be used by the user by calculating the connection score for each of the 40 third-party application and generating an engagement score for each. Continuing the example, the 10 third-party applications with the highest value engagement score is then displayed to the user in the application as recommendation. In some cases, the third-party application recommendation is based on a request from a user. In other cases, the third-party application recommendation is automatically generated.

Both the first and second deep-learning models include recurrent neural network(s) capable of generating values indicative of a prediction of user interest and retention, respectively, in third-party applications. The recommendation engine itself generates the recommendation for third-party applications by utilizing structured and unstructured data, standardizing such data (e.g., natural language processing techniques, PySpark, etc.), and generating a dynamic time dependent data of the user. By capturing various sources of data, the recommendation engine is able to generate a recommendation of third-party applications to the user that is of interest to and is likely to be used by the user.

Example Diagram of a Recommendation Engine

FIG. 1 depicts an example diagram 100 of a recommendation engine 102. The recommendation engine 102 is implemented as part of an application software program that is programmed to help users of the application perform a task. The recommendation engine 102 generates a recommendation to users of third-party applications based on a determination that the third-party application is relevant to and likely to be used by the user. In some cases, the third-party application is another application implemented by the organization or another entity (e.g., an individual, a different organization, etc.). The recommendation engine 102 includes a first model 104 and a second model 106. The first model 104 and the second model 106 are deep-learning models (e.g., recurrent neural networks) that have been trained to generate values indicative of a prediction of user interest in and retention of, respectively, third-party applications.

The first model 104, or click through retention model, determines whether a third-party application is relevant or of interest to the user (e.g., determining whether the user is likely to click on or connect to the third-party application if recommended by the recommendation engine). The first model 104 generates a relevance score for each available third-party application. To do so, the first model 104 accesses user data and application data to generate a score indicating whether a third-party application is relevant to the user. The first model 104 accesses user data from a user database 108. The user data includes time dependent data 112 and static profile data 114.

The time dependent data 112 stored in the user database 108 is routinely accessed by the first model 104 of the recommendation engine 102. For example, the recommendation engine 102 can retrieve time dependent data 112 for a user on a daily, weekly, etc. basis. The time dependent data 112 includes a set of time segments. Each time segment corresponds to a different period of time. For example, a first time period corresponds to the most recent 24 hours, and a second time period corresponds to the 48 hours prior to the most recent 24 hours. The time dependent data 112 is generated by identifying user activity for a time segment (e.g., the most recent 24 hours) and aggregating the user activity by the type of user activity. For example, the recommendation engine can generate the time dependent data by using a Hive query and retrieving user activity data. Once the time segment for the most recent time is generated, the time segments corresponding to the prior times are updated so that the recommendation engine 102 can track user activity across the time segments.

The static profile data 114 includes data from the application including the user's profile data, a product associated with the user (e.g., SKU, industry), etc. The static profile data 114 can include tenure (or use) of the application and/or associated product and/or service. The first model 104 also accesses application data in the application database 110 regarding applications used previously by the user, indicating the types of applications the user uses, as well as third-party applications available to the user. In particular, the first model 104 accesses the application identification 116 (index) associated with each third-party application. For example, the recommendation engine 102 (with authorization from the user) can access the computing device the application is installed on to identify which applications the user has downloaded on the computing device. Based on the identification, the corresponding application identification 116 is accessed by the first model 104. In another example, the recommendation engine 102 can access application identification 116 for each third-party application available for the user to download.

Using both the user data and the application data, the first model 104 of the recommendation engine 102 generates a relevance score 124 for each available third-party application by transforming the user data and application data into vectors. The first model 104 standardizes the user data and application data by leveraging PySpark, Hive, and other deep-learning techniques to generate vectors of the user data and application data.

For example, the time dependent data 112 can include user search keywords entered by the user in the past 24 hour time segment of the time dependent data 112. The first model 104 transforms the user search keywords of time dependent data 112 through PySpark into a standardized format. The standardized time dependent data is input into a long short-term memory (LSTM) of the first model 104 with the application data which generates a set of vectors. In some cases, there are some extra parameters to be tuned. In other cases, additional module(s) can be included in the standardization process such as a bi-directional module.

In another example, the application identification of a third-party application is converted to a vector representation by the first model 104. In some cases, an average is determined for the vector representations for each third-party application.

Once vector representation(s) are generated for each vector, the first model 104 concatenates the vectors generated and passes the concatenated vector through an activation function (e.g., Softmax) to generate a relevance score for each available third-party application. The relevance score indicates whether the third-party application is of relevance or interest to the user. For example, if the application data regarding a rarely used application by the user was entered into the first model 104, the relevance score would be low for that third-party application (as well as other third-party applications associated with the same topic), reflecting the user's disinterest in the application. Based on the relevance scores of the third-party applications, the first model 104 determines those third-party applications that are relevant applications 126 to the user. For example, those third-party applications with relevance scores exceeding a threshold value can be relevant applications 126. As another example, the third-party applications with the highest relevance scores (e.g., the top-X relevance scores) can be the relevant applications 126. In some cases, the first model 104 can remove relevant third-party application(s) from further consideration that the user has previously downloaded and/or subscribed to. The application vector information generated by the first model 104 is stored in the shared feature table 128 and such information is used by the second model 106 so that the second model 106 does not waste resources re-generating the same information.

Once the first model 104 identifies the relevant applications 126, the relevant applications are arranged by row according to the following format: User# Rec. App.#: App Name (e.g., User1 Rec. App.1: AMZN). The relevant applications 126, arranged by row from highest ranking application of relevance to the lowest ranking application of relevance, is input to the second model 106 to generate a connection score 130 for the relevant applications 126. The second model 106, or the retention model, is trained using lifetime value data 122 that indicates the retention of the third-party application in numeric form. The lifetime value data 122 is further described below in FIG. 5.

In order to generate the connection scores 130 for each relevant application 126, the second model 106 accesses user data and application data from the user database 108 and application database 110, respectively. Unlike the first model 104, the second model 106 accesses additional types of application data. For example, the second model 106 accesses unstructured data such as user search history 118, application topic 120, user reviews of an application, tag data, application description, etc. The second model 106 standardizes all of the unstructured data into a standard format. For example, the second model 106 can remove any stop words and punctuations from the unstructured data and tokenizes such data. The second model 106 can perform TF-IDF to identify keywords and categorize the application by topic according to the non-negative matrix factorization (NMF).

The second model 106 transforms the user data and application data into a set of vectors. In addition, the second model 106 retrieves vector data regarding third-party applications from the shared feature table 128. The second model 106 concatenates all of the vector data and passes the concatenated vector through an activation function (e.g., sigmoid) to generate a connection score 130 indicative of predicted usage of a third-party application by the user. The second model 106 generates an engagement score 132 for each relevant third-party application based on combining the connection score 130 of the relevant third-party application with the corresponding relevance score 124 (e.g., multiplying the relevance score and the connection score). Based on the engagement score 132, the recommendation engine 102 determines the top-X third-party applications to recommend to the user. The recommended applications 134 are displayed to the user. In some cases, the recommended application 134 are displayed upon user request. In other cases, the recommended application 134 are displayed automatically in the user interface.

Example Time Dependent Data

FIG. 2 depicts an example 200 of time dependent data that is used by the recommendation engine to generate a recommendation of third-party applications that are of predicted relevance and use to the user. The time dependent data is user activity data collected by an application and aggregated into time segments. For example, in the context of a tax preparation application, such an application can collect information about the user interacting with the application, such as a user searching for a tax form, entry of user information, submitting a tax form, completing a financial transaction, etc. The user activity data that is collected is accessed by the recommendation engine. In some cases, the recommendation engine can generate the time dependent data by using a Hive query and retrieving user activity data based on the query. The time stamp of the user activity is identified for determining the time segment associated with the user activity.

As depicted, there are 10 time segments illustrated in this example of time dependent data as the "Look back period" column. In some cases, there can be more time segments or less time segments. Additionally, the time segments each correspond to a different amount of time. In some cases, the time segments are of increasing periods of time, giving greater weight to user activity closer to the present than user activity further in the past. For example, the first time segment in the "Look back period" column is 1 day, the second time segment is 2-7 days, and the time segments continue to increase up to the last time segment of 60-180 days.

The user activity data is categorized by type within each time segment. For example, in the context of a tax preparation application, the user activity of searching within the application for a tax form may correspond to Feature 1 whereas the user activity of completing a transaction may correspond to Feature 2.

There is also a corresponding rank associated with the user activity within a time segment. In some cases, the ranking indicates that the more recent time segments are more relevant than older time segments as user activity with those time segments closest to the present is indicative of user interests within the application.

The recommendation engine generates time dependent data routinely for the time segment associated closest to the present (e.g., time segment of 1 day) and updates the other time segments appropriately. By generating time dependent data, the recommendation engine standardizes user activity data by time and interest. In some cases, the number of user activities in each time segment and feature category is a numeric value that the recommendation engine can use to generate a recommendation of third-party applications to the user. For example, the first model can access the time dependent data (e.g., ranking, features) to include as inputs to generate the relevance score for a third-party application.

Example Diagram of Application Topic Data

FIG. 3 depicts example diagram 300 of application topic data. In order to generate a recommendation to a user for third-party applications, the recommendation engine determines what types of applications of may be of interest and use to the user according to the topic associated with the third-party application. For example, a topic can refer to a category type of application, such as e-commerce applications include Amazon, PayPal, Square, etc. The third-party application can have more than one corresponding topic (or category type).

In order to determine the topic of a third-party application, the recommendation engine retrieves application data such as unstructured data associated with the third-party application (e.g., user search history, user reviews of an application, tag data, application description, etc.). The recommendation engine uses natural language processing techniques to determine a topic associated with a third-party application. For example, the recommendation engine removes stop words and punctuation, tokenizes, and stems the unstructured data. The recommendation engine then performs TD-IDF to identify keywords and then performs NMF to aggregate the keywords into topic(s).

As depicted in FIG. 3, in the first column, there is a list of third-party applications. For example, "PYPL," "SQ," and "AMZN" are third-party applications that the recommendation engine can potentially recommend to the user. The number of third-party applications is not limited to those depicted and can include any number of third-party applications available to the user. Additionally, as depicted in FIG. 3, there can be as many as 50 topics for categorizing third-party applications. In some cases, there are more or less topics for consideration. In the first column, the application "PYPL" has a 0.1 value corresponding to Topic 1, 0.2 value corresponding to Topic 2, and 0.25 value corresponding to Topic 50.

The recommendation engine generates the topic scores, and the second model can use the topic data (e.g., topic score) to generate a connection score for predicting user retention of a third-party application.

Example Application Keyword Data

FIG. 4 depicts example diagram 400 of application keyword data. The application keyword data is user search data that is collected by the application when the user enters queries to a search within the application. As the user search data is unstructured data, the user search data undergoes natural language processing as described above with TF-IDF and NMF to determine which topic(s) the user search data corresponds to. For example, as depicted in FIG. 4, the user search terms "eCom" have a 0.7 value corresponding to Topic 1 and a 0.1 value corresponding to Topic 2 and "pay employees" has a 0.2 value corresponding to Topic 1 and 0.85 value corresponding to Topic 2.

When the recommendation engine is generating the recommendation, the second model can access user search data generated by a user in the application and determine which topic is similar to the user search data by determining a similarity score for each. Based on the similarity score, the topic(s) with the greatest value are identified and used to then identify corresponding third-party application(s) to recommend to the user.

Example Application Lifetime Value Data

FIG. 5 depicts example table 500 of application lifetime value data. The application lifetime value (LTV) data is a score that indicates how long a user has interacted with an application (e.g., user retention). Additionally, the LTV is used in training the second model to generate a connection score for a relevant, third-party application.

A higher LTV score indicates the user has connected and used an application for a long period of time. As depicted in FIG. 5, the first column is "Cust. ID" indicating the identification of a user of an application. Within the second column ("App Name") is the name of the third-party application. In the third column "App Connect" is a binary value indicating whether the user connected (or subscribed) to the third-party application. If the value is 0, then the user is not connected to the application. If the value is 1, then the user is connected to the application. Within the fourth column ("App LTV Score") is a value indicating the retention and use of the application. In some cases, if the user is not connected to the application, the LTV score is a low, non-zero value (e.g., 0.05 as indicated in FIG. 5). If the user is connected to the application, the LTV score reflects how long the user has been using the application. In cases where the LTV is close to 1, the user connects and interacts with the application often in comparison to other cases where the LTV is closer to 0.

Example User Interface Displaying a Recommendation

FIG. 6 depicts an example user interface 600 displaying a recommendation generated by the recommendation engine. As depicted in user interface 600, the recommended third-party application includes specific information about the application such as "Key benefits" to users, how the third-party application works as described under "How it works with QuickBooks," and rating data. The example user interface 600 also displays relevant information to help the user decide whether to subscribe and use the third-party application including an overview, pricing, reviews, FAQs, contact information, support information, developer information, terms and conditions of the third-party application, and privacy policy. The recommendation of the third-party application also includes a feedback option that the user can provide feedback about the third-party application based on either the recommendation and/or use of the third-party application. In some cases, the feedback provided by the user can be used by the recommendation engine for additional training to provide users with improved, tailored recommendations of third-party applications.

Though the user interface 600 depicts the recommendation of a single application with detailed information corresponding to the application, in some cases, the user interface can display a set of icons corresponding to each application recommended to the user. In such cases, the detailed recommendation of application as depicted in FIG. 6 can be displayed upon user selection of a third-party application.

Example Method for Generating a Recommendation

Figure 7:
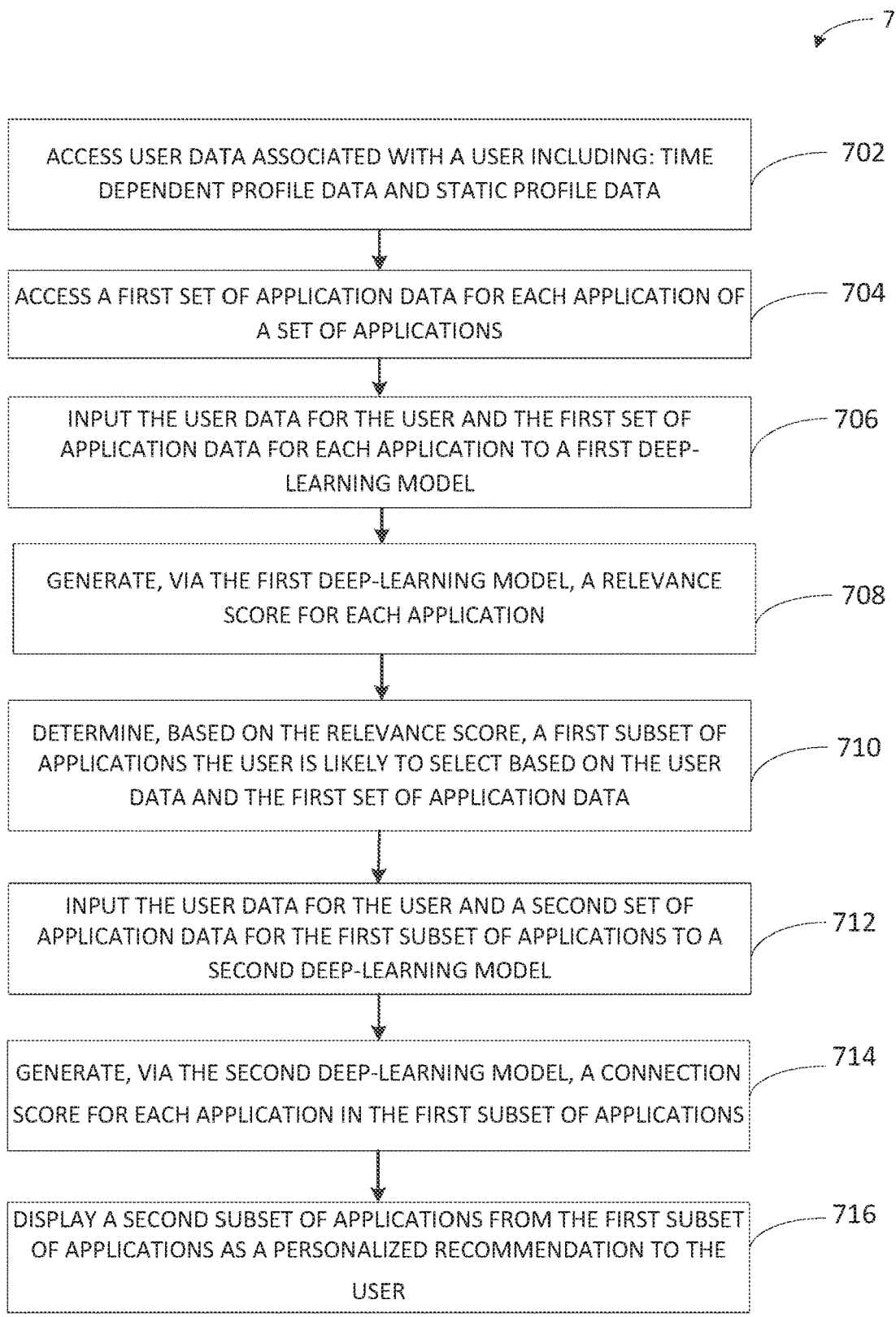
FIG. 7 depicts an example flow diagram for generating a recommendation to a user according to an embodiment.

FIG. 7 depicts an example method 700 for generating a recommendation of application(s), as described with respect to FIGS. 1-6.

At step 702, a recommendation engine accesses user data associated with a user including time dependent data and static profile data.

In some cases, the recommendation engine generates the time dependent data by identifying each user action performed by a user in a time segment and aggregating the user action by type for the time segment. The time segments can increase in coverage of time as more time passes. For example, a first time segment can be 24 hours (1 day), a second time segment can be the prior 48 hours (2 days), a third time segment can be the prior 120 hours (5 days), etc. In some cases, the user action is aggregated based on a time stamp associated with a user action.

In some cases, the time dependent data is generated on a periodic basis. For example, new time dependent data can be generated every day such that new user activity is included in the most recent time segment and the previous user activity is updated accordingly to the other corresponding time segments.

At step 704, a recommendation engine accesses a first set of application data for each application of a set of applications. For example, the first set of application data can include application identification data.

In some cases, the recommendation engine accesses the user data and the first set of application data automatically on a periodic basis. In other cases, the recommendation engine accesses the user data and the first set of application data upon a request from a user received by the recommendation engine for a recommendation of application(s).

At step 706, the recommendation engine inputs the user data for the user and the first set of application data for each application to a first deep-learning model. In some cases, the first deep-learning model is a CTR model.

At step 708, the recommendation engine generates, via the first deep-learning model, a relevance score for each application.

At step 710, the recommendation engine determines, based on the relevance score, a first subset of applications the user is likely to select based on the user data and the first set of application data.

At step 712, the recommendation engine inputs the user data for the user and a second set of application data for the first subset of applications to a second deep-learning model trained to predict a likelihood of a length of time the user will use an application in the first subset of applications. In some cases, the second deep-learning model is a retention model.

At step 714, the recommendation engine generates, via the second deep-learning model, a connection score for each application in the first subset of applications.

At step 718, the recommendation engine displays a second subset of applications from the first subset of applications as a personalized recommendation to the user.

In some cases, the second subset of applications from the first subset of applications is displayed based on an engagement score. The engagement score is a combination of the relevance score and the connection score of an application. For example, the engagement score is calculated by multiplying the relevance score and the connection score.

In some cases, the personalized recommendation can be displayed as a separate window, page, tab, etc. within the application to the user. In other cases, the personalized recommendation can be displayed by embedding the recommendation in the current view. In such cases, the recommendation can be continuously displayed (and updated) as the user navigates within the application. For example, based on user activity within the application, the recommendation of third-party application(s) displayed to the user may change.

Example Server for the Recommendation Engine

Figure 8:
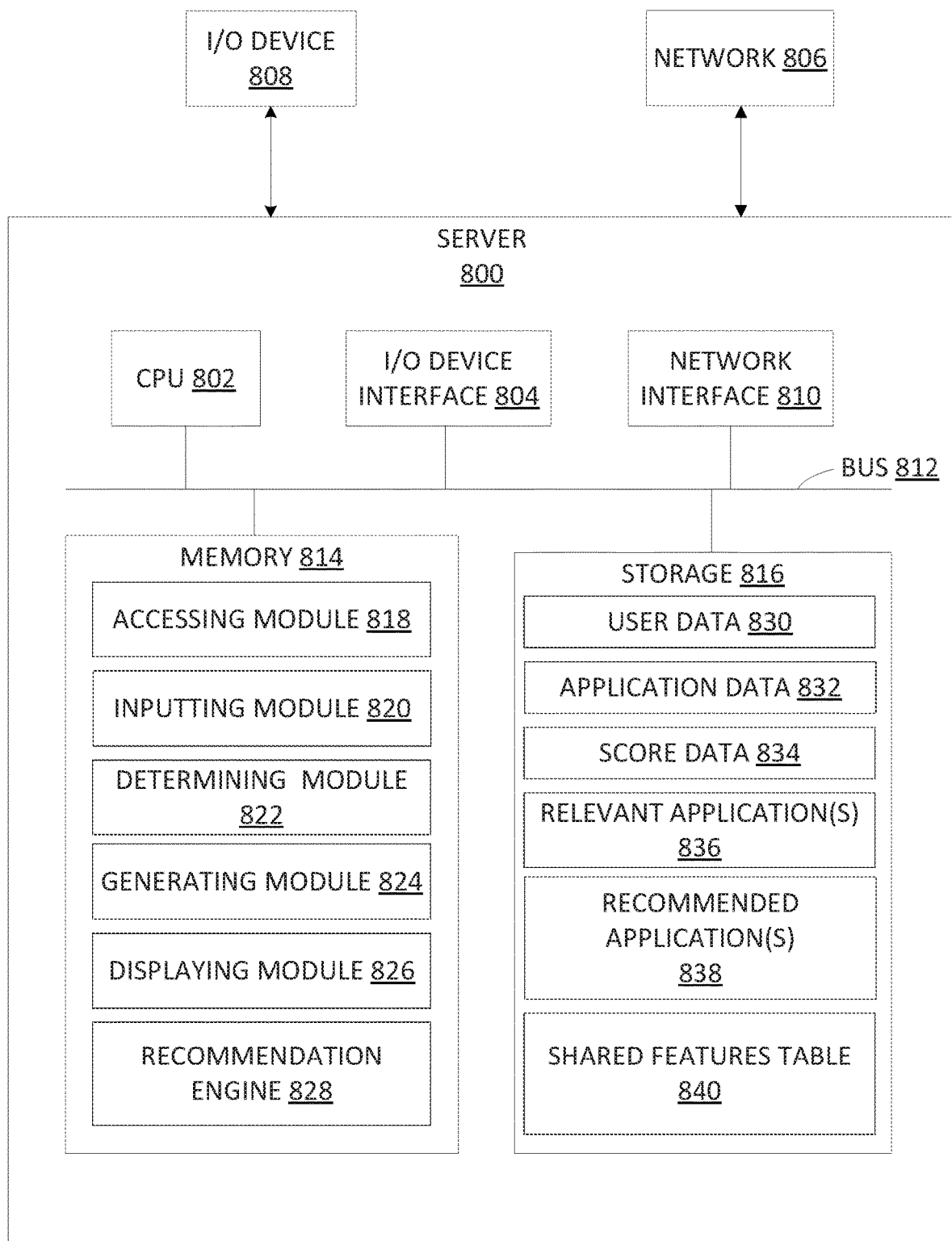
FIG. 8 depicts an example server for implementing the recommendation engine according to an embodiment.

FIG. 8 depicts an example server 800 that may perform the methods described herein, such as the method to generate a recommendation as described with respect to FIGS. 1-7. For example, the server 800 can be a physical server or a virtual (e.g., cloud) server. In some cases, when the user opens the application or is on a particular page (or view) within the application, a request is sent to the server 800 to retrieve the recommendation generated for display to the user.

Server 800 includes a central processing unit (CPU) 802 connected to a data bus 812. CPU 802 is configured to process computer-executable instructions, e.g., stored in memory 814 or storage 816, and to cause the server 800 to perform methods described herein, for example with respect to FIGS. 1-7. CPU 802 is included to be representative of a single CPU, multiple CPUs, a single CPU having multiple processing cores, and other forms of processing architecture capable of executing computer-executable instructions.

Server 800 further includes input/output (I/O) device(s) 808 and interfaces 804, which allows server 800 to interface with input/output devices 808, such as, for example, keyboards, displays, mouse devices, pen input, and other devices that allow for interaction with server 800. Note that server 800 may connect with external I/O devices through physical and wireless connections (e.g., an external display device).

Server 800 further includes network interface 88, which provides server 800 with access to external network 806 and thereby external computing devices.

Server 800 further includes memory 814, which in this example includes accessing module 818, inputting module 820, determining module 822, generating module 824, displaying module 826, and a recommendation engine 828 for performing operations described in FIGS. 1-7.

Note that while shown as a single memory 814 in FIG. 8 for simplicity, the various aspects stored in memory 814 may be stored in different physical memories, but all accessible by CPU 802 via internal data connections such as bus 812.

Storage 816 further includes user data 830, which may be like the user data such as time dependent data and static profile data, as described in FIGS. 1-4, 7.

Storage 816 further includes application data 832, which may be like the application data such as application identification, user search history, application topic, lifetime value data, as described in FIGS. 1, 3-5, and 7.

Storage 816 further includes score data 834, which may be like the score data such as relevance score, connection score, and engagement score, as described in FIGS. 1, 7.

Storage 816 further includes relevant applications 836, which may be like the relevant applications identified by the first model of the recommendation engine, as described in FIGS. 1-2, 7.

Storage 816 further includes recommended applications 838, which may be like the recommended applications identified by the second model of the recommendation engine, as described in FIGS. 1-2 and 6-7.

Storage 816 further includes a shared feature table 840, which may be like the shared feature table of the recommendation engine, as described in FIGS. 1, 2, 7.

While not depicted in FIG. 8, other aspects may be included in storage 816.

As with memory 814, a single storage 816 is depicted in FIG. 8 for simplicity, but various aspects stored in storage 816 may be stored in different physical storages, but all accessible to CPU 802 via internal data connections, such as bus 812, or external connection, such as network interfaces 804. One of skill in the art will appreciate that one or more elements of server 800 may be located remotely and accessed via a network 806.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
accessing user data associated with a user including:
time dependent data, and
static profile data,
accessing a first set of application data for each application of a set of applications;
inputting the user data for the user and the first set of application data for each application to a first deep-learning model;
generating, via the first deep-learning model, a relevance score for each application indicative of a likelihood of a user selecting the application by associating the user data with application data for the application;
determining, based on the relevance score, a first subset of applications the user is likely to select based on the user data and the first set of application data;
inputting the user data for the user and a second set of application data for the first subset of applications to a second deep-learning model;
generating, via the second deep-learning model, a connection score for each application in the first subset of applications indicative of a likelihood of a length of time the user will use the application in the first subset of applications;
identifying a second subset of applications from the first subset of applications based on the connection scores; and
displaying the second subset of applications as a personalized recommendation to the user.

2. The method of claim 1, wherein the method further comprises generating the time dependent data by:
identifying each user action performed by the user in a time segment; and
aggregating the user action by type for the time segment.

3. The method of claim 2, wherein the method further comprises:
generating the time dependent data on a periodic basis; and
upon generating new time dependent data, updating the user action by type for each time segment.

4. The method of claim 2, wherein the time dependent data includes at least a first time segment and a second time segment, and wherein the first time segment and the second time segments are associated with different amounts of time.

5. The method of claim 1, wherein the method further comprises:
generating an engagement score based on the relevance score and connection score for each application in the first subset of applications.

6. The method of claim 1, wherein the second deep-learning model is trained using an application lifetime value for each application.

7. The method of claim 1, wherein the first set of application data includes an application identification, and wherein the second set of application data includes:
user search history for applications;
the relevance score of an application; and
a topic corresponding to the application.

8. A system, comprising:
a processor; and
a memory storing instructions which when executed by the processor perform a method comprising:
accessing user data associated with a user including:
time dependent data, and
static profile data,
accessing a first set of application data for each application of a set of applications;
inputting the user data for the user and the first set of application data for each application to a first deep-learning model;
generating, via the first deep-learning model, a relevance score for each application indicative of a likelihood of a user selecting the application by associating the user data with application data for the application;
determining, based on the relevance score, a first subset of applications the user is likely to select based on the user data and the first set of application data;
inputting the user data for the user and a second set of application data for the first subset of applications to a second deep-learning model;
generating, via the second deep-learning model, a connection score for each application in the first subset of applications indicative of a likelihood of a length of time the user will use the application in the first subset of applications;
identifying a second subset of applications from the first subset of applications based on the connection scores; and
displaying the second subset of applications as a personalized recommendation to the user.

9. The system of claim 8, wherein the method further comprises generating the time dependent data by:
identifying each user action performed by the user in a time segment; and
aggregating the user action by type for the time segment.

10. The system of claim 9, wherein the method further comprises:
generating the time dependent data on a periodic basis; and
upon generating new time dependent data, updating the user action by type for each time segment.

11. The system of claim 9, wherein the time dependent data includes at least a first time segment and a second time segment, and wherein the first time segment and the second time segments are associated with different amounts of time.

12. The system of claim 8, wherein the method further comprises:
generating an engagement score based on the relevance score and connection score for each application in the first subset of applications.

13. The system of claim 8, wherein the second deep-learning model is trained using an application lifetime value for each application.

14. The system of claim 8, wherein the first set of application data includes an application identification, and wherein the second set of application data includes:
user search history for applications;
the relevance score of an application; and
a topic corresponding to the application.

15. A non-transitory computer-readable storage medium comprising instructions that, when executed by one or more processors of a computing system, cause the computing system to perform a method, the method comprising:
accessing user data associated with a user including:
time dependent data, and
static profile data,
accessing a first set of application data for each application of a set of applications;

inputting the user data for the user and the first set of application data for each application to a first deep-learning model;

generating, via the first deep-learning model, a relevance score for each application indicative of a likelihood of a user selecting the application by associating the user data with application data for the application;

determining, based on the relevance score, a first subset of applications the user is likely to select based on the user data and the first set of application data;

inputting the user data for the user and a second set of application data for the first subset of applications to a second deep-learning model trained to predict a likelihood of a length of time the user will use an application in the first subset of applications;

generating, via the second deep-learning model, a connection score for each application in the first subset of applications indicative of a likelihood of a length of time the user will use the application in the first subset of applications;

identifying a second subset of applications from the first subset of applications based on the connection scores; and displaying the second subset of applications as a personalized recommendation to the user.

16. The non-transitory computer-readable storage medium of claim 15, wherein the method further comprises generating the time dependent data by:
identifying each user action performed by the user in a time segment; and
aggregating the user action by type for the time segment.

17. The non-transitory computer-readable storage medium of claim 16, wherein the method further comprises:
generating the time dependent data on a periodic basis; and
upon generating new time dependent data, updating the user action by type for each time segment.

18. The non-transitory computer-readable storage medium of claim 16, wherein the time dependent data includes at least a first time segment and a second time segment, and wherein the first time segment and the second time segments are associated with different amounts of time.

19. The non-transitory computer-readable storage medium of claim 15, wherein the method further comprises:
generating an engagement score based on the relevance score and connection score for each application in the first subset of applications.

20. The non-transitory computer-readable storage medium of claim 15, wherein the second deep-learning model is trained using an application lifetime value for each application.

* * * * *